United States Patent
Natali

(10) Patent No.: US 6,925,803 B2
(45) Date of Patent: Aug. 9, 2005

(54) ELECTROMECHANICAL ACTUATOR FOR THE REGULATION OF THE TURBOCHARGER OF INTERNAL COMBUSTION ENGINES

(76) Inventor: Gianfranco Natali, 8, Via Castelletto, CH-6924 Sorengo (CH)

( * ) Notice: Subject to any disclaimer, the term of this patent is extended or adjusted under 35 U.S.C. 154(b) by 0 days.

(21) Appl. No.: 10/602,612

(22) Filed: Jun. 25, 2003

(65) Prior Publication Data

US 2004/0016233 A1 Jan. 29, 2004

(30) Foreign Application Priority Data

Jul. 23, 2002 (IT) .................................. AR2002A0027

(51) Int. Cl.[7] .......................... F02D 23/00; F16K 31/02; H01L 41/06; H01F 5/00
(52) U.S. Cl. ................. 60/602; 251/129.2; 310/316.03; 335/266
(58) Field of Search ............... 60/602, 603; 310/12–39, 310/316.03; 318/135; 251/129.2, 129.04; 137/554; 335/266

(56) References Cited

U.S. PATENT DOCUMENTS

| | | | | |
|---|---|---|---|---|
| 3,425,009 A | * | 1/1969 | Voigt et al. ................. 310/14 |
| 3,589,345 A | * | 6/1971 | Benson ................. 310/316.03 |
| 3,763,412 A | * | 10/1973 | Detrick et al. ............... 318/135 |
| 3,980,908 A | * | 9/1976 | McClintock ................. 310/14 |
| 4,477,875 A | * | 10/1984 | Suzuki et al. ................. 60/603 |
| 4,556,038 A | * | 12/1985 | Okamoto et al. ............. 60/602 |
| 4,656,400 A | * | 4/1987 | Pailthorp et al. ........... 318/135 |
| 4,665,348 A | * | 5/1987 | Stupak, Jr. .................. 318/135 |
| 5,095,234 A | * | 3/1992 | Hara ........................... 310/14 |
| 5,152,145 A | * | 10/1992 | Miotke et al. ................. 60/602 |
| 5,309,050 A | * | 5/1994 | Morinigo et al. ............. 310/14 |
| 5,519,295 A | * | 5/1996 | Jatnieks ...................... 318/135 |
| 5,602,431 A | * | 2/1997 | Satomi et al. ................ 310/14 |
| 5,783,915 A | * | 7/1998 | Shida et al. ................. 318/135 |
| 5,955,798 A | * | 9/1999 | Ishiyama et al. ............. 310/14 |
| 6,002,184 A | * | 12/1999 | Delson et al. ................ 310/14 |
| 6,134,889 A | * | 10/2000 | Markyvech et al. .......... 60/602 |
| 6,265,957 B1 | * | 7/2001 | Baginski et al. ............ 335/266 |
| 6,360,541 B2 | * | 3/2002 | Waszkiewicz et al. ........ 60/602 |
| 6,700,232 B2 | * | 3/2004 | Rieck et al. .................. 310/14 |

FOREIGN PATENT DOCUMENTS

JP            05291030 A    * 11/1993 .................. 310/14

* cited by examiner

Primary Examiner—Thai-Ba Trieu
(74) Attorney, Agent, or Firm—Young & Thompson

(57) ABSTRACT

An actuator includes a solenoid with a ferromagnetic nucleus which slides inside the solenoid. The nucleus is combined with a rod appropriate for interacting with a turbocharger's pivot point. The actuator is provided with a sensing system of the position of the ferromagnetic nucleus in the solenoid. The actuator also includes an electronic circuit which:—on the way in receives at least the signal from the engine's electronic control unit and the feedback signal, connected to the position of the ferromagnetic nucleus of the solenoid;—on the way out it distributes the electric current, connected to the entry signals, with which it feeds the solenoid.

16 Claims, 2 Drawing Sheets

ELECTROMECHANICAL ACTUATOR FOR THE REGULATION OF THE TURBOCHARGER OF INTERNAL COMBUSTION ENGINES

BACKGROUND OF THE INVENTION

The invention concerns an electromechanical actuator with which one can adjust the turbocharger of internal combustion engines.

It is known that turbochargers for internal combustion engines need a regulating apparatus to regulate the exit pressure of the compressor.

Said apparatus is activated by an actuator controlled by the engine's electronic control unit (ECU), or by another equivalent system. The aim is to supply the necessary power to move or maintain the turbocharger's regulation levers in the correct position. To maximize the efficiency of the turbocharger at each change of the engine's operational regime, it is indispensable that the regulation of the exit pressure of the compressor be the quickest and most precise possible, with reference to the signals from the ECU or any other equivalent electronic system, hereinafter called for simplicity's sake electronic control unit.

Independently from the way in which the compressor's exit pressure has charged, therefore either in the "waste gate" type of solution, or in the solution in which the inclination of the turbine's stator blade (variable geometry turbocharger), said adjustments are normally carried out through the linear sliding, or nearly linear, of a pivot point.

At the present state of the art the most common systems for the carrying out of the regulation of the turbocharger are two:

the first is a pneumatic type and it covers about 99% of the applications;

the second, called REA (Rotatory Electric Actuator), the object of the U.S. Pat. No. 6,360,541B2, is of the electric type.

The pneumatic type actuator, the first type, is composed of a single effect jack—comprising a sealed chamber, a membrane and a piston with a spring—which functions in compression or in depression.

The control of the turbocharger by the engine's electronic control unit is indirect or may be even absent when in the turbochargers with connection and pressure catch directly from the crankcase of the compressor.

In fact the signal transmitted by th engine's electronic control unit inflects an electric valve which, by acting on a constant pressure tank, adjusts the pressure or depression values that must reach the actuator which, consequently, controls the pivot point. Said system, although relatively economical, carries the following disadvantages:

it is imprecise due to the plurality of levers and of the non negligible relevance of the internal frictions which also determine a hysteresis of the same system;

it is slow, due to the pneumatic activation, therefore, when there are sudden changes in the engine's regimen, the fluid dynamic transients constrain the system's responsene capacity;

it requires a dedicated pneumatic system with connectors, tank and regulation electro-valve which change with the change of the engine on which said actuator is applied.

The REA type actuator, the second type, comprises an electric motor and a speed reduction group with a rotating exit. The control system interacts with a plurality of sensors among which the exhaust gas recirculation system (EGR) to co-ordinate the operations of the turbocharger with those of the engine and the EGR.

Said REA type actuator therefore:

requires an electric motor with reduction group which limits its speed and increases the exit torque to make it appropriate for controlling the pivot point;

it needs a plurality of control connections which require specific adjustments for its use with different engines;

it moves into the "hot spot" the electronics related to a series of activities which, in other types of actuators, are normally carried out by the engine's electronic control unit;

it is rather complex and therefore costly.

SUMMARY OF THE INVENTION

The aim of the present invention is the creation of a device with which one can operate on the regulation of the turbocharger of internal combustion engines, therefore a device with which to command the pivot point. Said device must be structurally simple, efficient and easily applicable to engines which differ. Another aim of the invention is that of achieving a device which reduces the complexity of the motor mechanism as a consequence of its introduction. Another aim of the invention is that of achieving a device with a linear movement, or one that is nearly so, of its control element that must be connected to the pivot point so as a simplify its installation and the transmission of the forces and the movement to the said pivot point.

Finally one more aim, is the creation of a device which is not encumbered by hysteresis error, which has very short reaction times to the commands it receives, so that it increases the efficiency and flexibility of the engine-turbocharger system.

The invention which has allowed us to each these results is obtained by the combination of:

a) an electromechanical group comprising a solenoid that generates a magnetic field, provided with a ferromagnetic nucleus sliding inside it, combined with a rod capable of interacting with the pivot point of the turbocharger, furthermore supplied with a sensing system for the position of the ferromagnetic nucleus inside it;

b) an electronic circuit which:—on the way it receives at least the signal from the electronic control unit of the engine and the retroaction signal or the feedback signal connected to the position of the ferromagnetic nucleus of the solenoid;—on the way out it supplies the electric current connected to said entry signals and with which it feeds the solenoid gene ting said magnetic field.

Such an invention is particularly advantageous since it is constructively very simple, it is efficient and, above all, it is very versatile in the sense that it is easily applicable or adaptable to different engines.

Another advantage of this invention is owed to the fact that it reduces the complexity of the engine plant, given that it does not use pneumatic groups and it does not require connections to particular sensors distributed in the vehicle and capable of registering, instant by instant, the operative conditions.

Another advantage derives from the fact that the organ which is intended for the actuation of the pivot point, that is the rod combined with the ferromagnetic nucleus sliding inside the solenoid, during its operation is subject only to axial sliding, so that it is easy to connect to the pivot point and, at the same time, it facilitates the connection of the mechanical structure of the solenoid on the turbocharger piloted by it or on another part of the engine.

Another advantage derives from the fact that frictions are very limited, therefore the hysteresis effects which they tend to generate are practically null and in any case, instant by instant, are compensated, given that the position of the ferromagnetic nucleus and therefore the activation extent of the turbocharger is linked to the feedback signal, which allows the necessary compensations. Furthermore, the response to operative variations of the engine is immediate and almost instantaneous, and in any case the response time is minimal, allowing in this way a continuous optimal regulation of the pressure exiting from the compressor group of the turbocharger.

Other advantages will appear obvious to the operators of this field by reading the following description.

BRIEF DESCRIPTION OF THE DRAWINGS

The invention will in fact be easily understood in its functional logic by the detailed description which follows and which refers to the block diagrams and the schematic drawings which exemplify the preferred embodiments of the said invention.

In the drawings.

Figure 1:
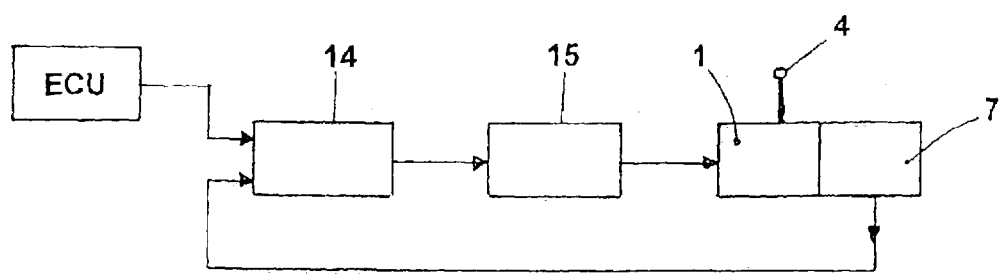
FIG. 1 reproduces the block diagram exemplifying the operation of the invention.

It is understood that the drawings are of the schematic type, with the aim of facilitating the comprehension of the invention, without constituting, in any way, a limitation to it.

DESCRIPTION OF THE PREFERRED EMBODIMENT

In substance, the invention therefore consists of an electromechanical actuator with which, on the variation of the engine's operational conditions, the operational conditions of at least the turbocharger, through which the supercharging of the same engine is regulated, are changed.

The actuator, the object of the present invention, through which the pivot point of the turbo charger is activated, is made up of a combination of an electromechanical group and of an electronic regulation and control circuit. The electromechanical group, schematized in FIG. 4, comprises the solenoid 1 provided with a ferromagnetic nucleus 2, normally created with a ferromagnetic material having minimal hysteresis.

Said ferromagnetic nucleus, slides within the solenoid 1 and is furnished with a rod 3 that interacts with the pivot point 4 of the turbocharger 5.

Figure 2:
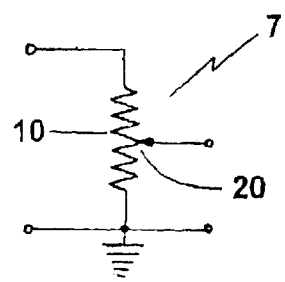
FIG. 2 exemplifies the embodiment in which the sensor which detects the position of the ferromagnetic nucleus in the solenoid is made with an electric resistor which acts as a potentiometer.

The ferromagnetic nucleus 2, in the solution exemplified in the drawing, through lever 6 activates the position sensor 7, intended to register and notify its position. In said position sensor 7 is of the resistive type and operates, for example, as shown in FIG. 2. For instance, lever 6 of FIG. 4 supports electric contacts 20, capable of inter acting with resistance 10, normally of the linear type. At each instant, the electric contacts 20 define therefore the position occupied by the ferromagnetic nucleus 2 in solenoid 1. In another embodiment the position sensor 7 is made with a capacitive group that includes a capacitive element. In still another embodiment, the position sensor 7, that is the device through which the control of the ferromagnetic nucleus 2 in solenoid 1 is carried out, operates through a group which measures the inductance of the same solenoid 1 which changes on the variation of the amount of penetration inside it of the ferromagnetic nucleus 2. The group which measures the inductance of the solenoid includes an inductive element.

Figure 4:
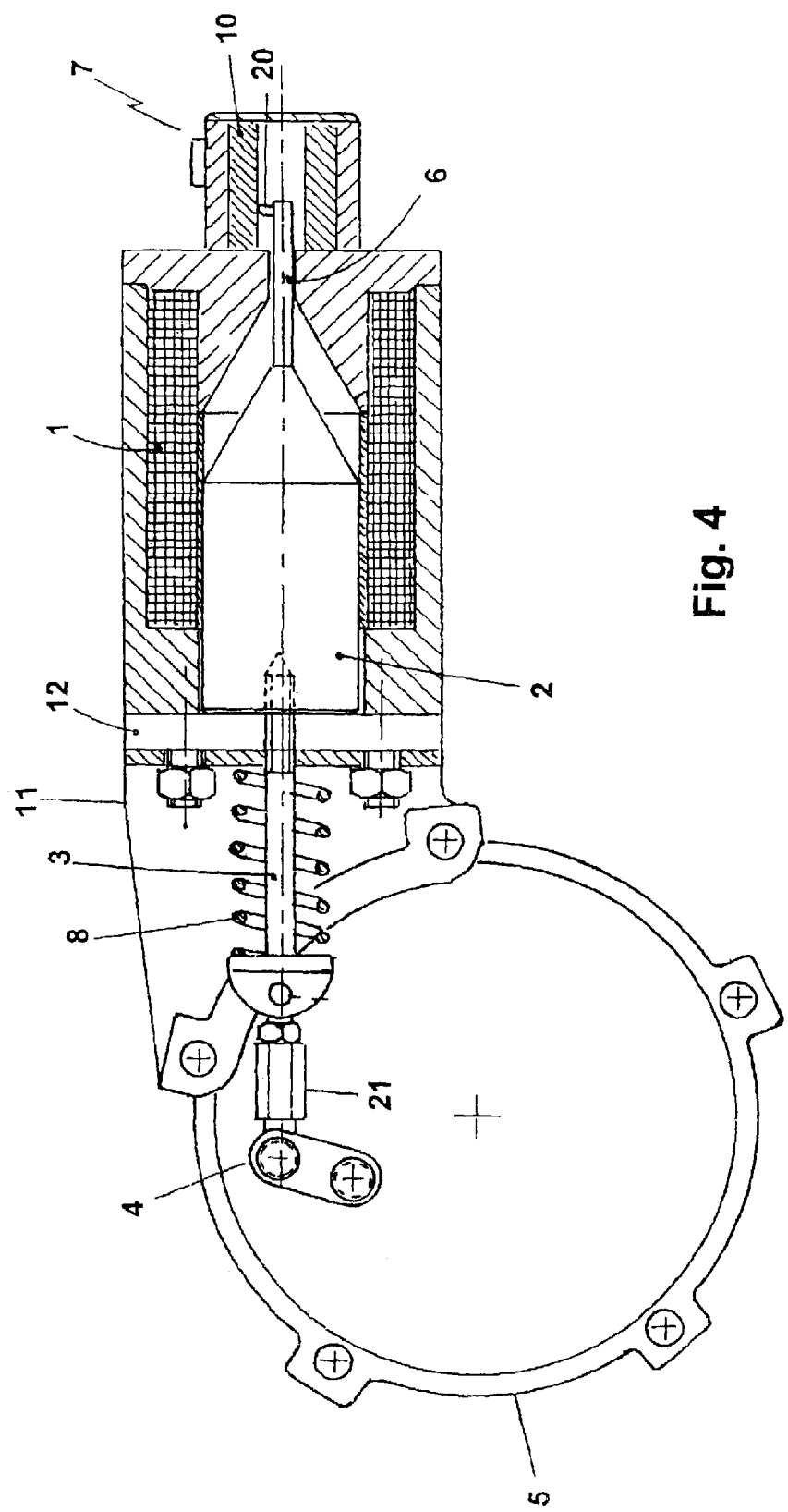
FIG. 4 is the front view of the electromechanical group, partially sectioned, showing the structure of the solenoid, of the sensor which detects the position of the ferromagnetic nucleus made with a resistor element, as well as of the attachment of the said group to the body of the turbocharger.

Different position sensors 7 can therefore be adopted to furnish, in any case, an exit feedback signal connected to the position of the ferromagnetic nucleus 2 with respect to solenoid 1. The reference position, therefore the starting point of the ferromagnetic nucleus 2 in the embodiment exemplified in FIG. 4, is constituted by the stop plate 12, against which ferromagnetic nucleus 2 is pushed by the compression spring 8, wrapped around rod 3.

Figure 3:
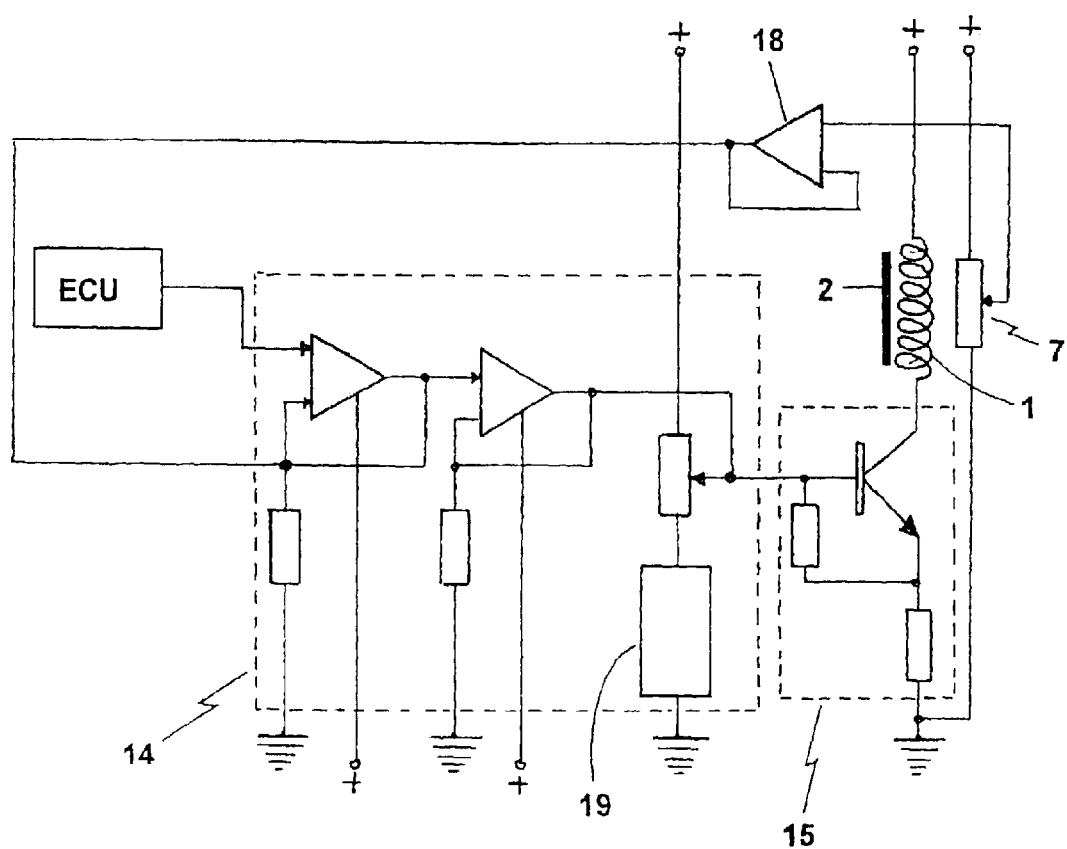
FIG. 3 is the electric circuitry exemplifying the invention.

The electronic circuit, shown in FIGS. 1 and 3, receives on the way in, at least the signal from the engine's electronic control unit, or by another equivalent system, and through position sensor 7 the retroaction or feedback signal, connected with the position of the ferromagnetic nucleus 2 of solenoid 1. On the way out, said electronic circuit, emits the electric current sent to solenoid 1, tightly connected to the two entry signals. The regulation and control of said electric current permits the regulation and control of the magnetic field produced by solenoid 1 and therefore the position of ferromagnetic nucleus 2.

At each issue of electric current sent to solenoid 1, therefore corresponds a position of the ferromagnetic nucleus 2 and a correspondent state of activation of lever 21, or of other regulation means typical of the turbocharger 5, terminating in pivot point 4.

The electromechanical group is provide with the appropriate means 11 for its anchoring on the turbocharger 5 or on the engine to which the turbocharger is applied. Means that can in any case vary abundantly at the change of the engine on which the invention is applied. Said means, normally, are of the flange type as exemplified in FIG. 4.

Solenoid 1 of said electromechanical group can have any type of structure. Normally, it consists of a coil, with one or more layers, manufactured with conducting wire, normally of copper, sheathed and/or coated with appropriate insulating material so that it can even be lodged in points which, during the operations of the engine, can reach relatively high temperatures.

Said solenoid 1 operates as a magnetic inductor and is combined with the ferromagnetic nucleus 2 with which rod 3 is joined and through which pivot point 4 is activated.

Said ferromagnetic nucleus 2, in the exemplified electromechanical solution, is also joined to lever 6, which activates position sensor 7. Said lever 6, at its free end, is normally equipped with high conductivity electric contact means 20, which rub on resistor 10, normally of the linear type, so that on the sliding of the ferromagnetic nucleus 2, said contact 20 will slide in a guided way on resistor 10, allowing the collection of a portion of the signal present at the ends of said resistor 10, with which it signals, to the programmed electronic control group, the exact position of the ferromagnetic nucleus 2 in solenoid 1. This allows to control instant by instant, for example, the sliding of the ferromagnetic nucleus which is required to cancel the eventual hysteresis effects.

The electronic circuit with which the current in solenoid 1 is controlled and adjusted, and therefore the movement of pivot point 4, at the variation of the operational conditions of the engine, is constituted of two parts, as exemplified in the figures 1 and 3. A first control part 14 which is constituted, for example, by a programmable micro controller, and a second part 15 of power with which solenoid 1 is fed with an intensity of current that can even reach various amperes.

The control part 14 carries at least two entrances from which it receives in one, the signal of the engine's electronic control unit, defining or in any case proportional to the operational state of the engine, in the other one, the feedback signal from the position sensor 7, controlled by the ferromagnetic nucleus 2 sliding in solenoid 1. This last signal allows, instant by instant, to know the position of the ferromagnetic nucleus 2 in the solenoid and therefore the position of the pivot point 4 of the turbocharger.

The electric circuit, in the embodiment reproduced in figure 3, is constituted therefore of a first part 14 comprising a differential amplifier unit which receives on the way in, the signal of the engine's electronic control unit and the retro-action or feedback signal amplified by amplifier 18 and originating from position sensor 7. It furthermore comprises the group 19, with which the temperature compensation is operated, so as to make the invention not influenced by the operational temperature conditions.

To said first part 14, follows the second part 15, or power part, with which solenoid 1 is controlled.

In the present invention, therefore, the operational state of the turbocharger is guided through an inductor solenoid electromechanical group, whose activation current is guided by the ECU type electronic control unit, or any other equivalent one, with a correction produced by position sensor 7 which indicates, instant by instant the position of the ferromagnetic nucleus 2 in solenoid 1 and therefore the position of the pivot point 4.

In the production phase the manufacturing details may also change, as long as the operational logic governing the invention remains the same, as defined by the following claims.

What is claimed is:

1. An electromechanical actuator for regulating a turbocharger of an internal combustion engine, comprising:
    a solenoid;
    a substantially solid ferromagnetic nucleus axially slidable within said solenoid, said ferromagnetic nucleus being balanced by a spring and having a rod at a first end thereof, the rod interacting with a pivot point of the turbocharger;
    a sensing system for sensing a position occupied by the ferromagnetic nucleus in the solenoid; and
    an electronic circuit which receives a first signal from the engine's electronic control unit and a feedback signal corresponding to a position of said ferromagnetic nucleus in said solenoid and that transmits to said solenoid a second signal for controlling a magnetic field produced by said solenoid.

2. The electromechanical actuators claimed in claim 1, further comprising a lever connected to a second end of said sliding ferromagnetic nucleus and making electrical contact with said sensing system.

3. An electromechanical actuator for regulating a turbocharger of an internal combustion engine, comprising:
    a solenoid having a sliding ferromagnetic nucleus therein, said sliding ferromagnetic nucleus is balanced by a spring and supplied with a rod at a first end thereof that interacts with a pivot point of the turbocharger;
    a sensing system for sensing a position occupied by the ferromagnetic nucleus in the solenoid, said sensing system being outside a boundary defined by said solenoid; and
    an electronic circuit which receives a first signal from the engine's electronic control unit and a feedback signal corresponding to a position of the ferromagnetic nucleus in the solenoid and that transmits to the solenoid a second signal for controlling a magnetic field produced by the solenoid.

4. The electromechanical actuator as claimed in claim 3, wherein the solenoid further comprises a coil made of conducting wire, said wire is one of sheathed and treated with insulating material so that the solenoid is usable at high temperatures.

5. The electromechanical actuator as claimed in claim 3, wherein the sensing system comprises a position sensor for controlling the position of the ferromagnetic nucleus in the solenoid.

6. The electromechanical actuator as claimed in claim 5, wherein the position sensor comprises a linear type resistor.

7. The electromechanical actuator as claimed in claim 5, wherein the position sensor comprises a capacitive element.

8. The electromechanical actuator as claimed in claim 5, wherein the position sensor comprises an element that measures the inductance of the solenoid upon the variation of the position of the ferromagnetic nucleus.

9. The electromechanical actuator as claimed in 3, wherein the spring surrounds the rod and pushes the ferromagnetic nucleus to a resting position.

10. The electromechanical actuator as claimed in claim 3, wherein the electronic circuit comprises one control part and one power part from which the solenoid is fed.

11. The electromechanical actuator as claimed in claim 3, wherein the electronic circuit comprises one control part with at least two entries, said one control part receives the signal from the engine's electronic control unit in one of said two entries and receives, through the sensor, the feedback signal corresponding to the position of the ferromagnetic nucleus in the solenoid in the other one of said two entries.

12. The electromechanical actuator as claimed in claim 3, wherein the electronic circuit comprises one control part that sends the electric current to the solenoid and that is linked to signals applied to entries of the one control part.

13. The electromechanical actuator as claimed in claim 3, wherein the electronic circuit comprises one control part having a differential amplifier unit which receives the signal from the engine's electronic control unit and the feedback signal coming from the sensor, and supplies, through a power amplifier part, a current with which the solenoid is controlled.

14. The electromechanical actuator as claimed in claim 3, further comprising means for anchoring the solenoid on the turbocharger.

15. The electromechanical actuator as claimed in claim 14, wherein said means for actuating is a flange type means for anchoring on the turbocharger.

16. The electromechanical actuator a claimed in claim 3, further comprising a lever connected to a second end of said sliding ferromagnetic nucleus and making electrical contact with said sensing system.

* * * * *